No. 756,973.

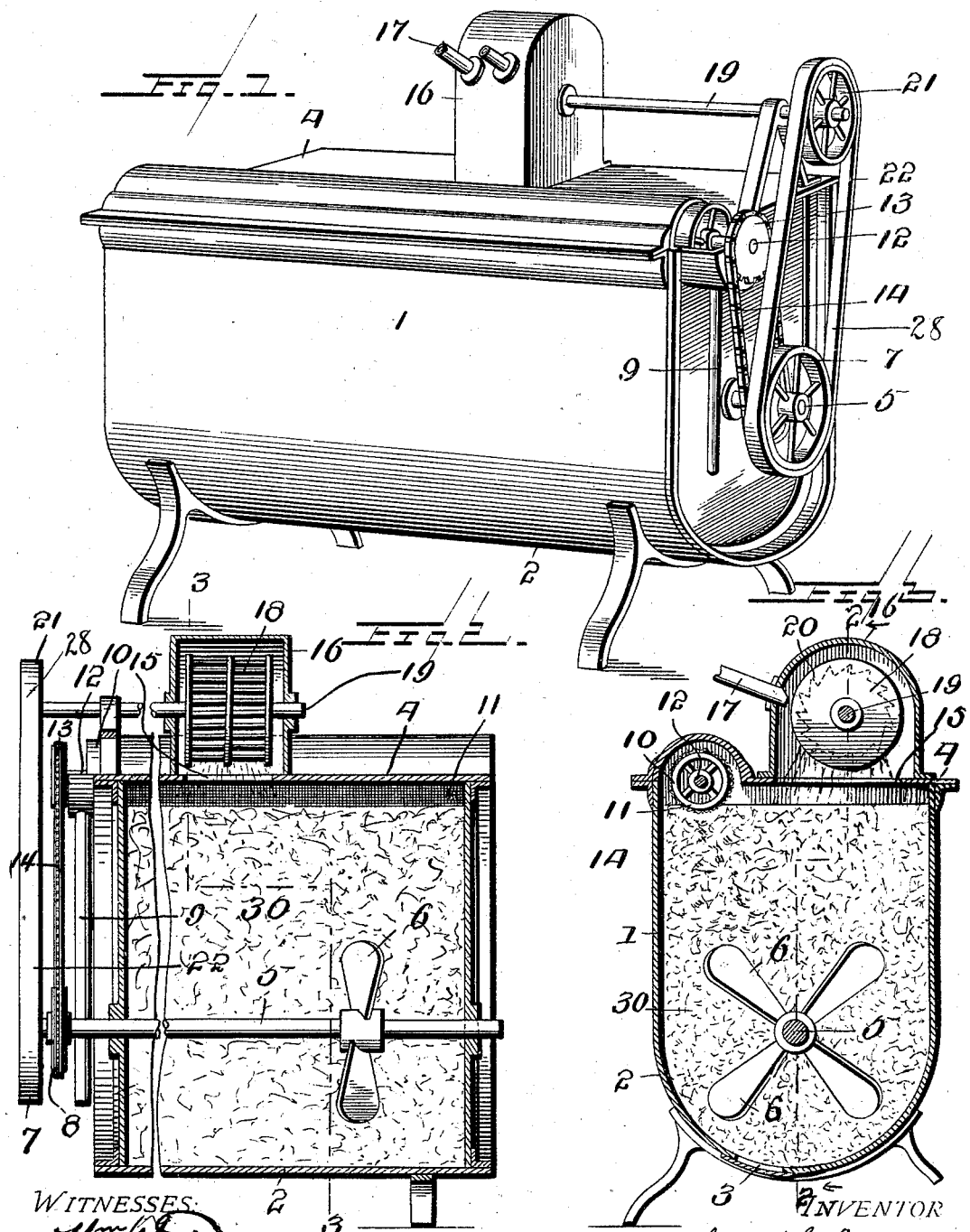

Patented April 12, 1904.

UNITED STATES PATENT OFFICE.

CHARLES H. LOEW, OF CLEVELAND, OHIO.

APPARATUS FOR WASHING FILTERING MATERIAL.

SPECIFICATION forming part of Letters Patent No. 756,973, dated April 12, 1904.

Application filed August 31, 1903. Serial No. 171,401. (No model.)

*To all whom it may concern:*

Be it known that I, CHARLES H. LOEW, a citizen of the United States, and a resident of Cleveland, in the county of Cuyahoga and State of Ohio, have invented certain new and useful Improvements in Apparatus for Washing Filtering Material, of which the following is a specification.

This invention relates to a machine for washing filtering material—such as cellulose, wood-pulp, and the like—which has become dirty from use in the filtering of beer, wine, and other liquids, thus preserving the said material to be used over and over again.

The invention consists in certain peculiarities in the construction and arrangement of parts and in certain novel combinations of elements, substantially as hereinafter described, and particularly pointed out in the subjoined claims.

After the filtering material has been used several times the agitation of the propeller-blades or other stirring mechanism now commonly employed in apparatuses for cleansing said material causes it to form in small knots about one-third the size of a grain of rice. When in this condition, its efficiency as a filtering material is greatly reduced, if not destroyed, because when placed in the filter interstices are left in the mass, through which the impurities suspended in the beer or other liquid being filtered will pass instead of being caught and retained by the filter mass.

One of the leading objects of the present invention is to provide an apparatus for cleansing filter mass which will serve not only to free said mass from the impurities therein, but will also operate either to prevent the formation of the knots described or, if said knots are formed, will serve to loosen the same and restore the filter mass to its original highly-efficient, loose, and fluffy condition.

A further object of the invention is to secure certain economies in the washing of filter mass by providing an apparatus in which the energy developed from the pressure in the water-supply may be employed to actuate the agitator and in which also the water after performing its said initial function is introduced into the filter mass in such manner and condition as to assist the agitator in the cleansing of the same and to assure that the filter mass shall leave the apparatus in a loose, fluffy, and flaky condition free from knots.

In short, the ultimate object of the invention is to provide an apparatus of maximum efficiency by reason of the fact that it is of most simple construction, most economically operated, and most effectually cleanses the filter mass and prolongs the usefulness thereof.

These objects are well accomplished by the construction illustrated in the accompanying drawings, in which—

Figure 1 is a perspective view of an apparatus embodying my improvements. Fig. 2 is a vertical longitudinal section through the same on the line 2 2 of Fig. 3, and Fig. 3 is a vertical transverse section on the line 3 3 of Fig. 2.

The same numerals of reference designate the same parts in the several views.

1 is the tank of the apparatus, preferably having a rounded bottom 2 and provided with an outlet 3, having a suitable closing means for the withdrawal of the cleansed filter mass. The top of the tank is provided with a cover 4, the whole or a suitable portion of which is removable to permit the filter mass to be introduced into the tank.

5 designates a shaft which extends longitudinally through the tank and is journaled in the end walls thereof and is provided within the tank with suitable agitator-blades 6. One end of this shaft extends to the outside of the tank and carries a pulley 7 and a sprocket-wheel 8 or other suitable gears.

Near the top of the tank and along one of its sides is located a pipe 9, through which the water and impurities are discharged from the tank. Leading to this discharge-pipe and arranged within the tank, near the top thereof, is a revolving cylinder 10, which occupies the entire length of the tank and is covered with a screen 11, of wire-gauze of mesh sufficiently close to exclude the filtering material, while admitting the fouled water to the interior of said cylinder, which water flows through said cylinder to the discharge-pipe 9. Said cylinder is mounted on a shaft 12, which is rotated to rotate the cylinder by means of a suitable connection—such as sprocket 13, chain 14, and sprocket 8—with the shaft 5.

Particular attention is called to the fact that the cover of the tank is provided with an elongated or large opening 15, through which the water, having little or no pressure, falls directly upon the top of the filter mass 30 in the tank in the form of a fierce spray or "rain," so to speak, and spreads out over practically the entire surface of the filter mass. This is of the utmost importance, as practical experience has demonstrated that when this water is introduced in this manner instead of through a small opening and under pressure and in a solid stream all tendency toward knotting of the fibers is obviated, or if the fibers become knotted the knots will be loosened and the filter mass will leave the tank in a fluffy and flaky condition with its original efficiency restored thereto.

In the drawings there is shown erected above the inlet-opening 15 of the tank a means which utilizes water under pressure to drive the agitator and the screen hereinabove mentioned, and from which means said water with its pressure exhausted is conducted to the filter mass, thus promoting to a maximum extent the economical cleansing of the filter mass. This means comprises a suitable casing 16, erected upon the top of the tank and having an open bottom which registers with the opening 15, a pipe or nozzle 17, through which water under pressure from a suitable supply, not necessary to show herein, is introduced, and a water-wheel 18, fixed on a shaft 19 and provided with cups or vanes 20. Said wheel is mounted in the casing, and the cups or vanes receive the impact of the incoming stream of water directed against them from the nozzle 17, and thus cause said water-wheel and shaft to rotate. The water having expended its force in turning said wheel and shaft is conducted by the vanes or cups to the opening 15 and falls through said opening in the form of a fierce spray or rain, splashing upon and covering practically the entire surface of the same and accomplishing the advantageous object hereinabove set forth. Moreover, the comparatively large size of the opening from the motor-casing prevents the motor from being choked by the water by allowing the water to flow very rapidly from the casing after it has accomplished its initial function of driving said motor.

The rotary movement of the shaft 19 is communicated to the agitator-shaft 5 by a pulley 21, belt 28, and pulley 7, or other suitable means, and thence to the cylinder 10 by the connecting means, hereinabove described, between said cylinder and shaft 5.

A further very important economy is effected by this apparatus in that being water-driven its use imposes no labor on the boiler or engine and avoids the expense of transmission-gearing, and, moreover, it may be mounted remote from the engine and in the cellars and contiguous to the filter, where there is always an abundant supply of water, thus obviating the loss of time and material incident to the carrying of the filter mass from the filter to the wash-room of the brewery, wherein the kegs or barrels are scrubbed, and in which room (which is generally a considerable distance from the cellars in which the filter is located) washing apparatuses hitherto proposed for filter mass are customarily located in order not to be too inconveniently located with respect to the engine or shafting.

Having thus described the invention, what I believe to be new and desire to secure by Letters Patent, and what I therefore claim, is—

1. An apparatus for cleansing filtering material, comprising a tank having an agitator therein and means for introducing water into the interior of said tank in the form of a fierce splash or rain.

2. An apparatus for cleansing filtering material, comprising a tank provided with a large water-inlet opening, an agitator in said tank, a water-supply pipe, and means intermediate of said water-supply pipe and water-inlet opening, serving to reduce the pressure of the water in its passage from said pipe to said opening, whereby the water is introduced into the interior of the tank in the form of a spray or rain, for the purpose set forth.

3. An apparatus for cleaning filtering material, comprising a tank provided with a large water-inlet opening, an agitator in said tank, and a water-motor connected with said agitator and arranged contiguous to said large water-inlet opening, whereby the pressure of water is reduced and said water introduced into the tank in the form of a spray or rain and the energy derived therefrom employed to operate the agitator.

4. An apparatus for cleaning filtering material, comprising a tank provided with a large water-inlet opening in its top, a casing located over said opening and having an open bottom in communication therewith, means through which water under pressure is supplied to said casing, a water-wheel in said casing, and an agitator in said tank connected with said wheel and driven thereby.

5. An apparatus for cleaning filtering material, comprising a tank provided with a large water-inlet opening, a casing located over said opening and having an open bottom in communication therewith, means through which water under pressure is supplied to said casing, a water-wheel in said casing, an agitator in said tank connected with said wheel and driven thereby, a rotative screen in said tank connected with said agitator, and a discharge-opening from the tank leading from said screen.

CHARLES H. LOEW.

Witnesses:
E. L. HARMON,
E. H. PFEIFFER.